United States Patent [19]

Masaki

[11] 4,368,704

[45] Jan. 18, 1983

[54] FAST IDLE DEVICE FOR CARBURETOR

[75] Inventor: Kenji Masaki, Yokohama, Japan

[73] Assignee: Nissan Motor Company, Limited, Yokohama, Japan

[21] Appl. No.: 206,310

[22] Filed: Nov. 12, 1980

[30] Foreign Application Priority Data

Nov. 15, 1979 [JP] Japan .......................... 54-158478[U]

[51] Int. Cl.[3] .............................................. B60K 31/00

[52] U.S. Cl. ..................................... 123/339; 123/588

[58] Field of Search ............... 123/339, 585, 586, 587, 123/588

[56] References Cited

U.S. PATENT DOCUMENTS

| | | | |
|---|---|---|---|
| 1,551,385 | 8/1925 | Gordon | 123/588 |
| 1,991,079 | 2/1935 | Brown | 123/339 |
| 2,269,704 | 1/1942 | Berry | 123/339 |
| 2,906,253 | 9/1959 | Nallinger | 123/339 |
| 2,929,369 | 3/1960 | Staege | 123/339 |
| 4,046,118 | 6/1977 | Aono . | |
| 4,057,042 | 8/1977 | Aono . | |
| 4,153,024 | 5/1979 | Bertling | 123/588 |
| 4,237,833 | 12/1980 | Des Lauries | 125/339 |
| 4,305,360 | 12/1981 | Meyer et al. | 123/339 |

FOREIGN PATENT DOCUMENTS

| | | |
|---|---|---|
| 1918707 | 1/1970 | Fed. Rep. of Germany . |
| 2274792 | 1/1976 | France . |
| 2439874 | 5/1980 | France . |
| 1209408 | 10/1970 | United Kingdom . |
| 1283826 | 8/1972 | United Kingdom . |
| 2035618 | 6/1980 | United Kingdom . |

*Primary Examiner*—P. S. Lall

*Attorney, Agent, or Firm*—Schwartz, Jeffery, Schwaab, Mack, Blumenthal & Koch

[57] ABSTRACT

A fast idle device for a carburetor is disclosed such that an optimum throttle valve opening (idle opening) is calculated through a calculating circuit based on various engine operating conditions, after the engine is started, and is controlled repeatedly, until the engine is fully warmed up, in such a way that the throttle valve movement urged by a return spring in the direction to close the valve is released steppedly by a ratchet mechanism. The fast idle device of the present invention comprises various sensors, a calculating circuit, and an electromagnetic ratchet mechanism, in addition to a conventional throttle valve.

4 Claims, 3 Drawing Figures

FAST IDLE DEVICE FOR CARBURETOR

BACKGROUND OF THE INVENTION

1. Field of the Invention

The present invention relates generally to a fast idle device for a carburetor, and more specifically to a fast idle device provided with a calculating circuit to electromagnetically control an optimum engine revolution speed when the engine is started or being warmed up.

2. Description of the Prior Art

Generally, a conventional carburetor is provided with a fast idle mechanism to produce an optimum engine idling speed according to the engine temperature when the engine is started or being warmed up. However, since the conventional mechanism comprises a cam and a lever, the engagement force therebetween increases with increasing engine temperature (explained in more detail hereinafter), thereby preventing the cam from rotating smoothly. This is because the initial load from the accelerator pedal is designed to be great and it therefore becomes necessary to depress the accelerator pedal deeply.

In addition, since automotive vehicles are usually used under diverse and severe operating conditions, that is, within a wide range of ambient temperature range from bitter cold to intense heat, there have been various problems in the use of a single fast idle cam in that a single cam cannot facilitate starting under all conditions, and may have the engine speed to become too high after starting. In addition, it is very difficult to determine an optimum cam profile which is suitable for the various conditions to be encountered.

BRIEF SUMMARY OF THE INVENTION

With these problems in mind, therefore, it is the primary object of the present invention to provide a fast idle device for a carburetor such that an optimum throttle valve opening rate (idle opening) is calculated based on engine operating conditions detected by sensors, when the engine is started, to automatically adjust the throttle valve.

To achieve the above mentioned object, the fast idle device of the present invention comprises various sensors for detecting engine operating conditions, a calculating circuit for obtaining an optimum throttle opening rate based on the detected results, and an electromagnetic ratchet-pawl mechanism for adjusting mechanically the throttle valve.

Additional objects, advantages and novel features of the invention will be set forth in part in the description which follows, and in part will become apparent to those skilled in the art upon examination of the folowing or may be learned by practice of the invention. The objects and advantages of the invention may be realized and attained by means of the instrumentalities and combinations particularly pointed out in the appended claims.

BRIEF DESCRIPTION OF THE DRAWING

The features and advantages of the fast idle device according to the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
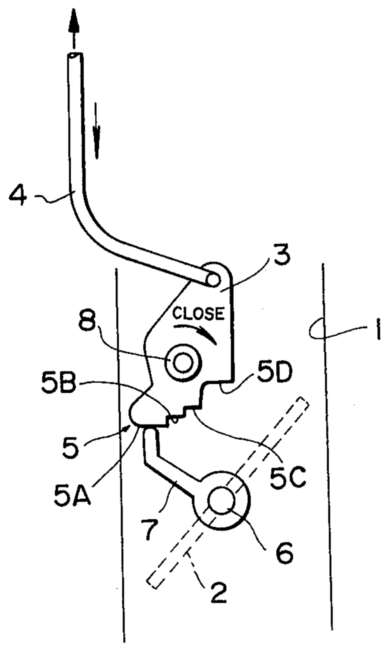
FIG. 1 PRIOR ART
FIG. 1 is a diagrammatical vertical view of a prior art fast idle device.

To facilitate understanding the present invention, a brief reference will be made to a conventional fast idle device provided for a carburetor. Referring to FIG. 1, the numeral 1 denotes a carburetor bore (intake path), and the numeral 2 denotes a throttle valve rotated by a fast idle cam 3. The fast idle cam is rotated about an axle 8 by a choke valve (not shown) and a rod 4. The cam 3 is formed so as to have stepped profiles 5A–5D and is brought into contact with a lever 7 connected to the throttle valve axle 6.

Since the fast idle cam 3 is mechanically connected to the choke valve, when the choke valve is fully closed, that is, when an air intake opening is fully choked by the choke valve, the rod 4 is moved upward in FIG. 1, so that the throttle valve 2 is opened.

FIG. 1 shows a state where the choke valve is almost fully closed to rotate the cam 3 counterclockwise to its extreme so that the lever 7 is brought into contact with the first cam profile position 5A to restrain the throttle valve 2 at its maximum closed position. In this state, the throttle valve 2 can further be opened counterclockwise but cannot further be closed, and thereby idle opening is kept large for maintaining an optimum engine speed when the engine is started or being warmed up in bitter cold weather.

Thereafter, if the choke valve is opened a little while the engine is gradually warmed up, the engine speed increases. As the engine warms up the fast idle cam 3 rotates clockwise as shown by the arrow mark in FIG. 1, and the lever 7 is shifted on the stepped profiles from 5A to 5B or 5C that is, the throttle valve idle-close position (a position at which the throttle valve is restrained in the state where the driver does not depress the accelerator pedal) is steppedly changed. When the lever is finally brought into contact with the cam profile 5D, the throttle valve is restrained at its maximum closed position. This indicates an idle condition where the choke valve is fully opened and the throttle valve is sufficiently closed, that is, that the engine is warmed up.

The conventional fast idle cam mechanism thus constructed as described above has had a problem such that as the engine is warmed up, the cam 3 cannot rotate smoothly because the lever 7 is strongly urged toward the cam 3. This is because the initial load (acting force) of the accelerator pedal connected to the throttle valve 2 is great, so that the level 7 cannot move on the cam profiles from the second cam position 5B to the third cam position 5C or the fourth cam position 5D. Therefore, in order to shift the lever 7, it has been necessary to depress the accelerator pedal deeply.

Figure 2:
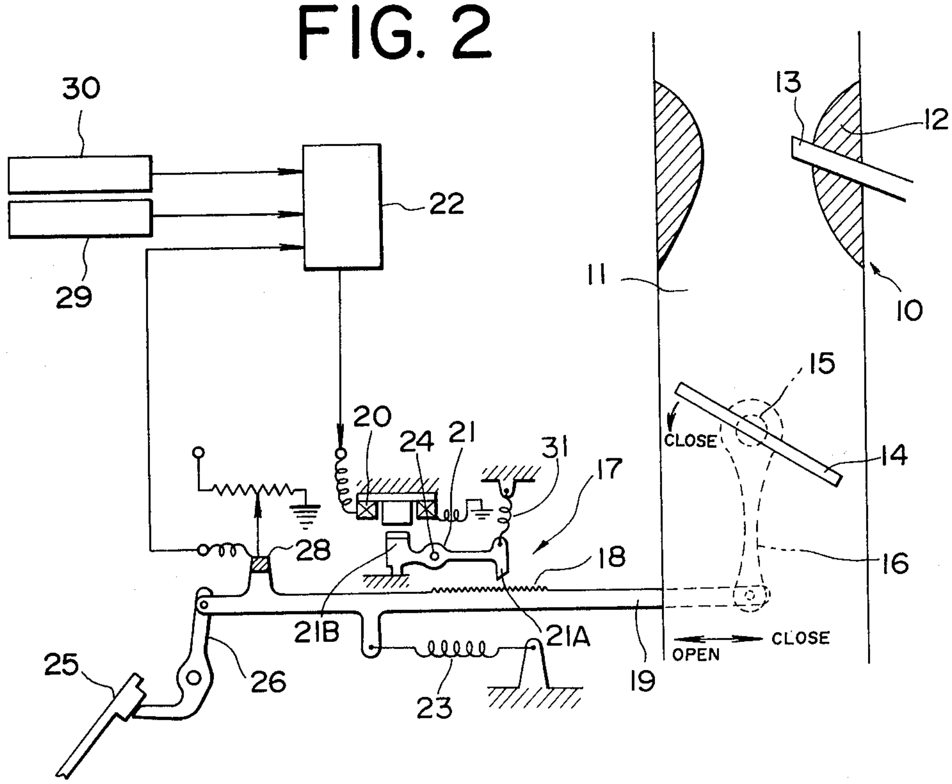
FIGS. 2 is a diagrammatical vertical, partly sectional view showing a first embodiment of the present invention.
Figure 3:
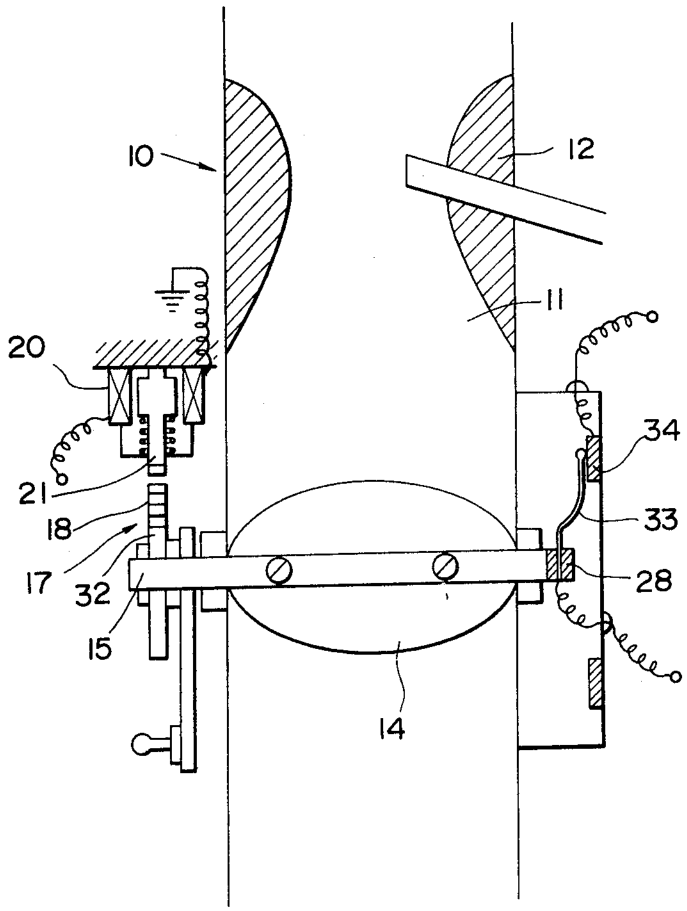
FIG. 3 is a diagrammatical vertical, partly sectional view showing a second embodiment of the present invention.

In view of the above description, reference is now made to FIGS. 2 and 3, and more specifically to FIG. 2, wherein a first embodiment of the fast idle device of the present invention is illustrated.

In FIG. 2, the numeral 10 denotes a carburetor body, 11 denotes an intake path, 12 denotes a venturi, 13 denotes a fuel nozzle, and 14 denotes a throttle valve, as in a conventional carburetor.

A lever 16 is rotatably fitted to a throttle valve axle 15, and an electromagnetic ratchet mechanism 17 is linked with the lever 16.

The electromagnetic ratchet mechanism 17 comprises a linkage 19 with a saw-toothed ratchet portion 18 linked to the lever 16 by a pin, and a ratchet pawl 21 actuated by a solenoid 20 energized in response to a signal produced from a calculating circuit 22 to control appropriate positions of the linkage 19.

Numeral 23 denotes a return spring for urging the linkage 23 in the direction that the throttle valve 14 is closed.

The ratchet pawl 21 can rotate with the axle 24 as a center and the ratchet pawl end 21A engages with the saw-toothed ratchet portion 18 to lock the linkage 19 in position when the solenoid 20 pulls up on end 21B of the ratchet pawl 21 against the force of the spring 31. In this case, the forms of the pawl tip 21A and the ratchet portion 18 are designed so that the linkage 19 can be moved to the left so as to open the throttle valve 14, if they are engaged with each other.

At the other end of the linkage 19, a rotatable lever 16, connected to an accelerator pedal 25 with a pin, is provided for moving the linkage 19 leftward to open the throttle valve 14 according to the amount of depression of the accelerator pedal.

A throttle valve opening sensor 28 is arranged, in the vicinity of the linkage 19, to detect the opening of the throttle valve 14 and to input the detected results to the calculating circuit 22.

In addition, various signals from an engine revolution speed sensor 29, an engine coolant sensor 30, and an intake air temperature sensor (not shown) are inputted to the calculating circuit 22 in which an optimum idle opening is determined based on these signals representative of the engine operating conditions.

Being composed of a microcomputer, the calculating circuit 22 stores the amount of the valve opening predetermined previously so as to obtain an optimum engine idle revolution speed according to the engine operating conditions.

Operation of the device thus improved will be described hereinbelow.

At starting, since no signal current is applied to the solenoid 20, the ratchet pawl 21 is away from the ratchet 18 and the throttle valve 14 is retained rightwardly in a full-closed state by the return spring 23.

Next, if the ignition switch is turned on and the accelerator pedal 25 is fully depressed, the calculating circuit 22 calculates an optimum position of the throttle valve on the basis of the engine temperature at the starting.

If the accelerator pedal 25 is released, the return spring 23 begins to close the throttle valve 14. In this case, since the position of the throttle valve is being detected by the throttle valve opening sensor 28, if the throttle valve reaches an optimum position, the solenoid 20 is energized by the signal from the calculating circuit 22 to actuate the ratchet pawl 21, so that the linkage 19 is locked in position for preventing the throttle valve 14 from being further closed. The opening of the throttle valve 14 increases with decreasing temperature.

After the engine is started, the calculating circuit 22 calculates an optimum throttle valve position based on the signals from the engine temperature sensor 30 and from engine revolution speed sensor 29. As the engine is warmed up, the solenoid 20 is momentarily deenergized repeatedly so as to decrease the opening of the throttle valve 14; the ratchet pawl 21 is repeatedly released from the ratchet teeth 18; the linkage 19 is steppedly moved to the right by the force of the return spring 23; the moment the calculated result coincides with the valve detected by the throttle valve opening sensor 28, the solenoid 20 is energized again to lock the linkage 19 in position.

Since the above operations are repeated, the throttle valve 14 is closed gradually; when the warming-up of the engine is completed, the throttle valve is returned to the ordinary idle opening, and the calculating circuit 22 deenergizes the solenoid 20 to release the ratchet pawl 21 from the ratchet teeth 18.

In this case, it is of course possible to accelerate the engine while the engine is being warmed up. This is because the ratchet teeth 18 of the linkage 19 are so designed as to be moved freely in the acceleration direction (leftward) independently of the engagement with the ratchet pawl 21 and, at the same time, the movement of the linkage 19 toward the acceleration direction is detected, so that the calculating circuit 22 deenergizes the solenoid 20.

FIG. 3 shows a second embodiment of the present invention. In this embodiment, the electromagnetic ratchet mechanism 17 comprises a ratchet pawl 21 directly connected to the solenoid 20 and a saw-toothed ratched wheel 32 fixed to a throttle valve axle 15. As in the first embodiment, according to an output signal from the calculating circuit, the ratchet pawl 21 is engaged with or released from the ratchet wheel 32 to determine an appropriate idle opening of the throttle valve 14.

In this case, as the throttle valve opening sensor 28, a potentiometer is used for supplying an output signal proportional to the throttle valve opening to the calculating circuit 22. A contacting member 33 fixed together to the throttle valve axle 15 is moved right and left on the surface of a resistor 34 according to the movement of the throttle valve 14.

Further as in the first embodiment, the ratchet teeth are formed so that the ratchet wheel 32 is movable in the direction the throttle valve 14 can be opened.

As explained above, according to the present invention, since the idle opening of the throttle valve can be controlled according to the engine operating conditions by an electromagnetic ratchet mechanism, it is possible to provide an appropriate engine revolution speed at all times when the engine is idling under various embient conditions, thus allowing improvement of engine operation stability when the engine is being warmed up.

In addition, engine speed is controlled based upon calculated results obtained through the calculating circuit in accordance with various engine operating conditions, it is possible to use a mass-production carburetor without any fine adjustment to various specific operating conditions.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A fast idle device for controlling a throttle valve positioned in the bore of a carburetor to open and close the bore and thereby control engine speed, comprising:

(a) a linkage for connecting an accelerator pedal to said throttle valve;

(b) a plurality of sensors for detecting various engine operating conditions;

(c) a throttle valve position sensor;

(d) a calculating circuit for storing throttle valve positions previously determined according to the engine operating conditions by which optimum engine idle speed can be obtained, said calculating circuit being connected to said engine operating condition sensors and said throttle valve position sensor and operable to output a throttle valve locking signal when a signal value from said throttle valve position sensor coincides with a stored throttle valve position value corresponding to the engine operating conditions detected by said engine operating condition sensors;

(e) a solenoid connected to said calculating circuit, said solenoid being energized in response to the throttle valve locking signal; and (f) an electromagnetic ratchet mechanism comprising:

(1) a ratchet pawl resiliently biased away from said linkage and operable to move against said bias when said solenoid is energized; and (2) a bias means connected to said linkage, said linkage further comprising a means for engaging said ratchet pawl, wherein said linkage is urged by said bias means to close said throttle valve when said ratchet pawl is not engaged with said engagement means and is locked when said ratchet pawl is engaged with said engagement means, whereby when said accelerator pedal is depressed to open said throttle valve and then released, said linkage is steppedly urged in a direction to close said throttle valve and is stopped to retain said throttle valve at a position corresponding to the sensed engine operating conditions by the operation of said calculating circuit energizing said solenoid with said locking signal which actuates said ratchet pawl.

2. A fast idle device for a carburetor as set forth in claim 1, wherein a plurality of said sensors for detecting various engine operating conditions are:

(a) a sensor for detecting engine coolant temperature; and (b) a sensor for detecting engine revolution speed.

3. A fast idle device as set forth in claim 1, wherein said engagement means comprises a saw-toothed ratchet with which said ratchet pawl is engageable.

4. A fast idle device for a carburetor as set forth in claim 3, wherein said linkage having said saw-toothed ratchet is a ratchet wheel, said ratchet wheel being directly connected to said throttle valve.

* * * * *